United States Patent [19]

Fukui

[11] Patent Number: 5,044,336
[45] Date of Patent: Sep. 3, 1991

[54] CYLINDER RECOGNITION APPARATUS AND METHOD FOR A MULTI-CYLINDER INTERNAL COMBUSTION ENGINE

[75] Inventor: Wataru Fukui, Himeji, Japan

[73] Assignee: Mitsubishi Denki Kabushiki Kaisha, Tokyo, Japan

[21] Appl. No.: 591,179

[22] Filed: Oct. 1, 1990

[30] Foreign Application Priority Data

Oct. 2, 1989 [JP] Japan .................................. 1-255172
Oct. 2, 1989 [JP] Japan .................................. 1-255173

[51] Int. Cl.$^5$ ............................................. F02P 7/073
[52] U.S. Cl. ..................................... 123/414; 73/116; 123/613
[58] Field of Search ............... 123/414, 479, 612, 613, 123/617, 630, 643; 73/116

[56] References Cited

U.S. PATENT DOCUMENTS

| | | | |
|---|---|---|---|
| 4,519,362 | 5/1985 | Arakawa et al. | 123/414 |
| 4,700,305 | 10/1987 | Lotterbach et al. | 364/431.03 |
| 4,932,388 | 6/1990 | Chiba et al. | 123/414 X |
| 4,959,996 | 10/1990 | Akasu | 123/414 X |
| 4,989,448 | 2/1991 | Fukui et al. | 73/116 |

*Primary Examiner*—Tony M. Argenbright
*Attorney, Agent, or Firm*—Sughrue, Mion, Zinn, Macpeak & Seas

[57] ABSTRACT

An improved cylinder recognition apparatus and method for a multi-cylinder internal combustion engine capable of recognizing a specific reference cylinder as well as the remaining cylinders of the engine by use of only a single signal. A signal generator generates a single output signal in synchrony with the rotation of the engine, the output signal including a plurality of positional pulses each representative of prescribed rotational positions of a corresponding cylinder, and a cylinder recognition pulse at a location near a specific one of the positional pulses corresponding to a specific cylinder. A microcomputer discriminates the cylinder recognition pulse among the signal generator output pulses so as to recognize the specific positional pulse corresponding to the specific cylinder. In one aspect, cylinder recognition is not performed or stopped in a specific engine operating range such as in an early stage of an engine starting period in which the rotation of the engine is liable to abruptly and greatly vary and an error in the recognition of the cylinder could result, so as to avoid any resultant damage to the engine. In another aspect, it is determined whether the result of the cylinder recognition is correct or incorrect, and if correct, the engine is controlled based on the result of the cylinder recognition, but if incorrect, the engine is controlled based on other engine operating parameters to avoid improper engine control resulting from incorrect cylinder recognition.

12 Claims, 5 Drawing Sheets

CYLINDER RECOGNITION APPARATUS AND METHOD FOR A MULTI-CYLINDER INTERNAL COMBUSTION ENGINE

BACKGROUND OF THE INVENTION

The present invention relates to a cylinder recognition apparatus and method for a multi-cylinder internal combustion engine which can recognize the operating condition or rotational position of each engine cylinder based on the output signals from a signal generator.

In order for a multi-cylinder internal combustion engine to properly operate, fuel injection, ignition and the like for each cylinder must take place at prescribed rotational positions or angles of the crankshaft of the engine, i.e., at the times when each piston of the engine is at prescribed positions with respect to top dead center. For this reason, an engine is equipped with a rotational position sensor such as a signal generator which senses the rotational angle or position of the crankshaft of the engine.

Figure 5:
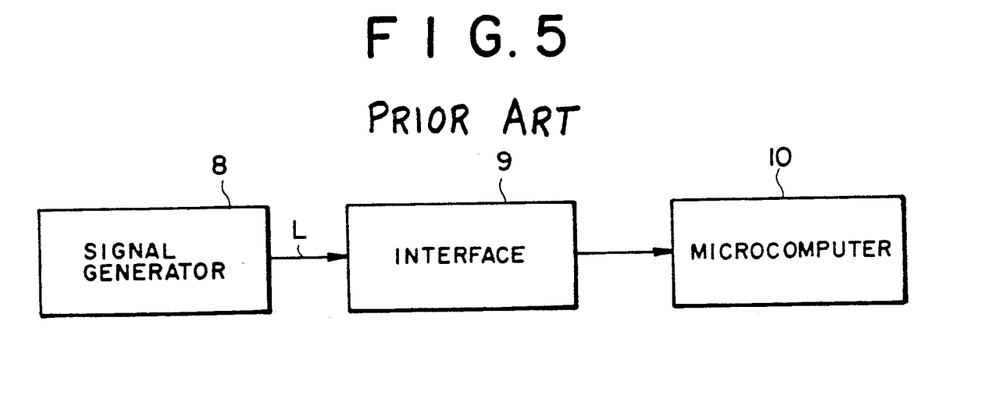
FIG. 5 is a schematic block diagram of a conventional cylinder recognition apparatus for a multi-cylinder internal combustion engine.

FIG. 5 illustrates, in a block diagram, a conventional cylinder recognition apparatus for a multi-cylinder internal combustion engine. The cylinder recognition apparatus includes a signal generator 8 which generates a positional signal L including a plurality of positional pulses corresponding to the respective cylinders of the engine, an interface circuit 9, and a microcomputer 10 which receives the positional signal L from the signal generator 8 through the interface circuit 9 and recognizes, based thereon, the operating condition (i.e., crank angle or rotational position) of each cylinder.

Figure 6:
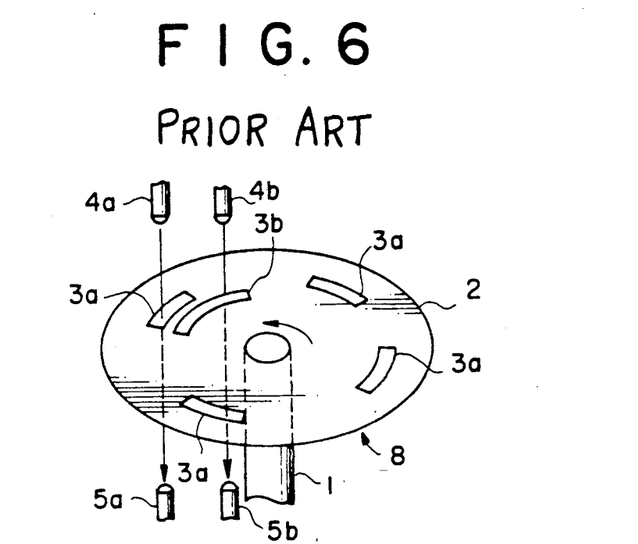
FIG. 6 is a perspective view illustrating the general arrangement of a conventional signal generator employed with the conventional cylinder recognition apparatus of FIG. 5.

A typical example of such a signal generator 8 is illustrated in FIG. 6. In this figure, the signal generator 8 illustrated includes a rotating plate 2 mounted on a rotating shaft 1 (such as the distributor shaft) which rotates in synchrony with the crankshaft of the engine. The rotating plate 2 has a set of first slits 3a formed therethrough at prescribed locations. The slits 3a are disposed at equal intervals in the circumferential direction of the rotating plate 2. The slits 3a, which are equal in number to the cylinders, are disposed so as to correspond to prescribed rotational angles of the crankshaft and thus to prescribed positions of each piston with respect to top dead center for sensing when the crankshaft reaches a prescribed rotational position for each cylinder. Another or second slit 3b is formed in the rotating plate 2 adjacent one of the first slits 3a at location radially inwardly thereof for sensing when the crankshaft rotational angle is such that the piston of a specific reference cylinder is in a prescribed position.

Figure 7:
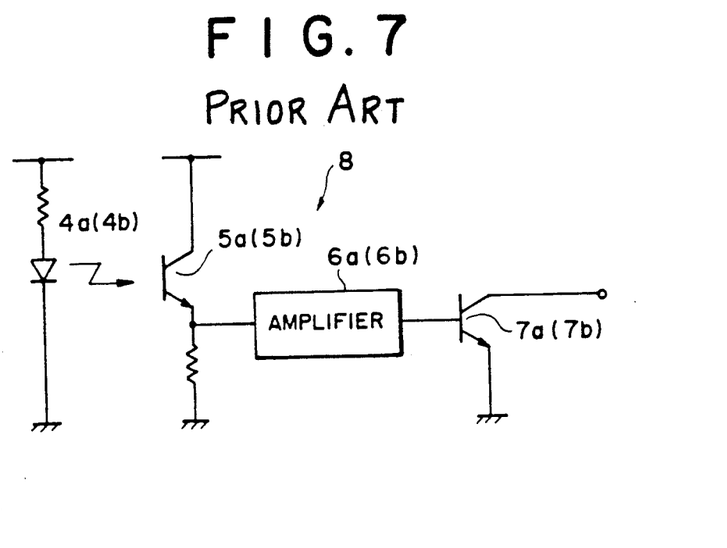
FIG. 7 is a schematic circuit diagram of the conventional signal generator of FIG. 6.

A first and a second light emitting diode 4a, 4b are disposed on one side of the rotating plate 2 on a first outer circle and a second inner circle, respectively, on which the outer slits 3a and the inner slits 3b are respectively disposed. A first and a second light sensor 5a, 5b each in the form of a photodiode are disposed on the other side of the rotating plate 2 in alignment with the first and the second light emitting diode 4a, 4b, respectively. The first light sensor 5a generates an output signal each time one of the outer slits 3a passes between the first light sensor 5a and the first light emitting diode 4a. Also, the second light sensor 5b generates an output signal each time the inner slit 3b passes between the second light sensor 5b and the second light emitting diode 4b. As shown in FIG. 7, the outputs of the first and second light sensors 5a, 5b are input to the input terminals of corresponding amplifiers 6a, 6b each of which has the output terminal coupled to the base of a corresponding output transistor 7a or 7b which has the open collector coupled to the interface circuit 9 (FIG. 5) and the emitter grounded.

Figure 8:
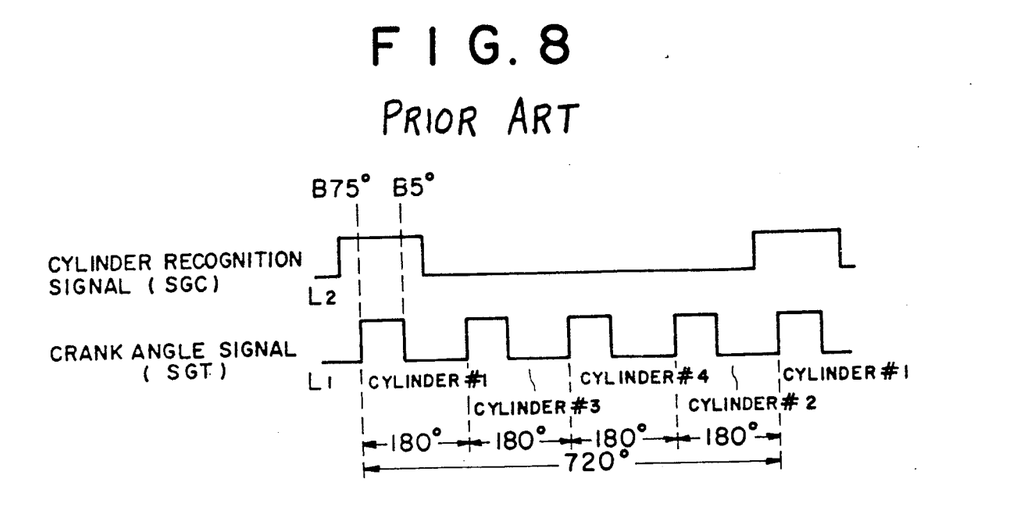
FIG. 8 is a waveform diagram of a crank angle reference signal $L_1$ and a cylinder recognition signal $L_2$.

Now, the operation of the above-described conventional cylinder recognition apparatus as illustrated in FIGS. 5 through 7 will be described in detail with particular reference to FIG. 8 which illustrates the waveforms of the output signals of the first and second light sensors 5a, 5b.

As the engine is operated to run, the rotating shaft 1 operatively connected with the crankshaft (not shown) is rotated together with the rotating plate 2 fixedly mounted thereon so that the first and second light sensors 5a, 5b of the signal generator 8 generate a first and a second signal $L_1$, $L_2$ each in the form of a square pulse. The first signal $L_1$ is a crank angle signal called SGT signal and has a rising edge corresponding to the leading edge of one of the outer slits 3a (i.e., a first prescribed crank angle or position of a corresponding piston) and a falling edge corresponding to the trailing edge thereof (i.e., a second prescribed crank angle of the corresponding piston). In the illustrated example, each square pulse of the SGT signal $L_1$ rises at the crank angle of 75 degrees before top dead center (a first reference position B75 degrees) of each piston, and falls at the crank angle of 5 degrees before top dead center (a second reference position B5 degrees).

The second signal $L_2$ is a cylinder recognition signal called SGC signal, and has a rising edge corresponding to the leading edge of the inner slit 3b and a falling edge corresponding to the trailing edge thereof. The SGC signal $L_2$ is issued substantially simultaneously with the issuance of an SGT signal pulse corresponding to the specific reference cylinder #1 so as to identify the same. To this end, the inner slit 3b is designed such that it has a leading edge which corresponds to a crank angle before the first reference angle of the corresponding SGT signal pulse (i.e., a crank angle greater than 75 degrees before TDC), and a trailing edge corresponding to a crank angle after the second reference angle of the corresponding SGT signal pulse (i.e., a crank angle smaller than 5 degrees before TDC). Thus, actually, the rising edge of an SGC signal pulse occurs before that of a corresponding SGT signal pulse, and the falling edge of the SGC signal pulse occurs after that of the corresponding SGT signal pulse.

The two kinds of first and second signals $L_1$, $L_2$ thus obtained are input via the interface circuit 9 to the microcomputer 10 which recognizes the specific reference cylinder #1 based on the second signal $L_2$, and the operational positions (i.e., crank angles or rotational positions) of the remaining cylinders #2 through #4 based on the first signal $L_1$, whereby various engine operations such as ignition timings, fuel injection timings, etc., are properly controlled.

With the conventional cylinder recognition apparatus for a multi-cylinder internal combustion engine as described above, however, two pairs of light emitting diodes 4a, 4b and light sensors 5a, 5b are required for generating two kinds of output signals $L_1$, $L_2$ including the crank angle reference signal SGT and the cylinder recognition signal SGC. As a result, there arises the problem that the overall construction of the cylinder recognition apparatus becomes complicated, thus increasing the manufacturing cost thereof.

SUMMARY OF THE INVENTION

Accordingly, the present invention is intended to obviate the above-described problem of the conventional cylinder recognition apparatus.

An object of the present invention is to provide an improved cylinder recognition apparatus and method for a multi-cylinder internal combustion engine which is able to recognize a specific cylinder as well as the remaining cylinders by use of only a single output signal of a signal generator.

Another object of the present invention is to provide an improved cylinder recognition apparatus and method for a multi-cylinder internal combustion engine which is simple in construction and which is able to be reduced into practice at low costs.

A further object of the present invention is to provide an improved cylinder recognition apparatus and method for a multi-cylinder internal combustion engine in which cylinder recognition is not performed or stopped in a specific engine operating range such as in an early stage of an engine starting period in which the rotation of the engine is liable to abruptly and greatly vary and an error in the recognition of the cylinders could result, so as to avoid any resultant damage to the engine.

A yet further object of the present invention is to provide an improved cylinder recognition apparatus and method for a multi-cylinder internal combustion engine in which the result of cylinder recognition is evaluated so as to avoid improper engine control resulting from incorrect cylinder recognition.

In order to achieve the above objects, according to one aspect of the present invention, there is provided a cylinder recognition apparatus for a multi-cylinder internal combustion engine comprising:

a signal generator for generating a single output signal in synchrony with the rotation of the engine, the output signal including a plurality of positional pulses each representative of prescribed rotational positions of a corresponding cylinder, and a cylinder recognition pulse at a location near a specific one of the positional pulses corresponding to a specific cylinder; and a controller for discriminating the cylinder recognition pulse from among the pulses contained in the output signal of the signal generator so as to recognize a specific positional pulse corresponding to a specific cylinder, the controller being operable to stop cylinder recognition in an early stage of an engine starting operation.

Preferably, the controller operates to stop cylinder recognition during a predetermined period of time from the beginning of the engine starting operation.

According to another aspect of the present invention, there is provided a cylinder recognition method for recognizing the operating states of cylinders of a multi-cylinder internal combustion engine, the method comprising the following steps:

generating, in synchrony with the rotation of the engine, a single signal including a plurality of positional pulses each representative of prescribed rotational positions of a corresponding cylinder, and a cylinder recognition pulse at a location near a specific one of the positional pulses corresponding to a specific cylinder;

determining whether the engine is in an early stage of an engine starting operation;

discriminating the cylinder recognition pulse among the pulses contained in the single signal so as to recognize the specific positional pulse corresponding to the specific cylinder if it is determined that the engine is not in an early stage of an engine starting operation; and stopping cylinder recognition if the engine is in an early stage of an engine starting operation.

According to a further aspect of the present invention, there is provided a cylinder recognition apparatus for a multi-cylinder internal combustion engine comprising:

a signal generator for generating a single output signal in synchrony with the rotation of the engine, the output signal including a plurality of positional pulses each representative of prescribed rotational positions of a corresponding cylinder, and a cylinder recognition pulse at a location near a specific one of the positional pulses corresponding to a specific cylinder; and a controller for discriminating the cylinder recognition pulse from among the pulses contained in the output signal of the signal generator so as to recognize a specific positional pulse corresponding to a specific cylinder, the controller being operable to determine whether the result of the cylinder recognition is correct or incorrect.

Preferably, the controller sets a flag when the specific cylinder is recognized, but does not set a flag when such cylinder recognition is not performed. The controller operates to evaluate the result of the cylinder recognition based on a comparison of the order of a series of flags thus set with a predetermined flag order and determines that the result of the cylinder recognition is correct if the order of the set flags matches the predetermined flag order.

Preferably, the controller operates to control the engine based on the result of the cylinder recognition if the cylinder recognition is correct, but based on other engine operating parameters than the result of the cylinder recognition if the cylinder recognition is incorrect.

In one embodiment, the operation of the engine to be controlled is the ignition timings of the respective cylinders.

According to a yet further aspect of the present invention, there is provided a cylinder recognition method for a multi-cylinder internal combustion engine, the method comprising the following steps:

generating, in synchrony with the rotation of the engine, a single signal including a plurality of positional pulses each representative of prescribed rotational positions of a corresponding cylinder, and a cylinder recognition pulse at a location near a specific one of the positional pulses corresponding to a specific cylinder;

discriminating the cylinder recognition pulse from among the pulses contained in the single signal so as to recognize a specific positional pulse corresponding to a specific cylinder; and determining whether the result of the cylinder recognition is correct or incorrect.

The above and other objects, features and advantages of the present invention will become more readily apparent from the ensuing detailed description of a preferred embodiment of the invention taken in conjunction with the accompanying drawings.

DESCRIPTION OF THE PREFERRED EMBODIMENT

The present invention will now be described in detail with reference to a preferred embodiment as illustrated in the accompanying drawings.

First, it should be understood that the general arrangement of a cylinder recognition apparatus for a multi-cylinder internal combustion is similar to that of the conventional one illustrated in FIG. 5. However, a signal generator, which is generally designated by reference numeral 108 in FIG. 1, is different in construction and operation from the conventional one as illustrated in FIG. 6.

Figure 1:
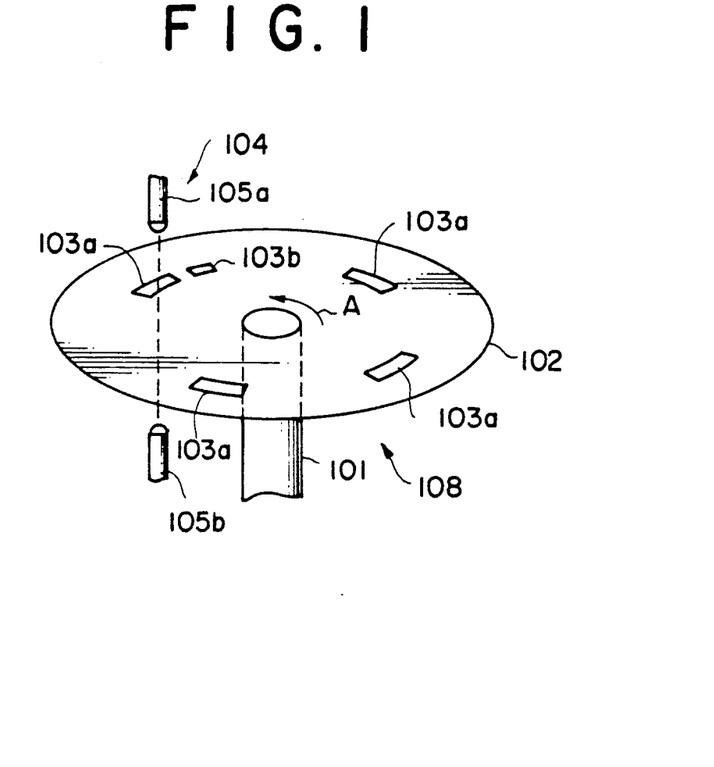
FIG. 1 is a perspective view schematically illustrating the arrangement of a signal generator for use with the present invention.

More specifically, as shown in FIG. 1, the signal generator 108 of the present invention includes a rotating shaft 101 operatively connected with the crankshaft (not shown) of a multi-cylinder internal combustion engine, and a rotating plate 102 fixedly mounted on the rotating shaft 101, as in the conventional signal generator 8 of FIG. 5. The rotating plate 102 has a plurality of first slits 103a formed therein at locations circumferentially spaced from each other at equal intervals, each of the slits 103a relating to a corresponding cylinder of the engine. The first slits 103a are disposed on a circle around the axis of the rotating shaft 101 and have substantially the same circumferential length. A second slit 103b is formed in the rotating plate 102 at a location near a specific one (e.g., corresponding to a specific reference cylinder #1) of the first slits 103a. The second slit 103b is disposed on the same circle on which the first slits 103a are disposed. In the illustrated example, the second slit 103b is circumferentially spaced a prescribed limited distance from the specific one of the first slits 103a in a direction opposite to the rotating direction of the rotating shaft 101. In FIG. 1, although the second slit 103b is illustrated to have a circumferential length less than that of the first slits 103a, it may have a circumferential length equal to or greater than that of the first slits 103a. However, it is preferable that the circumferential length of the second slit 103b be much shorter than that of the first slits 103a so as to simplify the cylinder recognition process which will be described later with reference to the flow chart of FIG. 3. In addition, the second slit 103b may be disposed such that it is circumferentially spaced from the specific one of the first slits 103a in a direction in which the rotating shaft 101 rotates.

A photocoupler 104 is provided near the rotating plate 102 for generating an output signal when it senses that one of the first and second slits 103a, 103b in the rotating plate 102 passes a prescribed location during the rotation of the rotating plate 102. The photocoupler 104 includes a single pair of a light emitting diode 105a and a light sensor 105b in the form of a photodiode which are disposed on the opposite sides of the rotating plate 102 in alignment with each other on the circle on which the first and second slits 103a, 103b are disposed. The light sensor 105b generates an output signal in the form of a square pulse each time it receives light which was emitted from the light emitting diode 104 and which passed through the first slits 103a or the second slit 103b, i.e., at the time when one of the slits 103a, 103b traverses between the light emitting diode 104 and the light sensor 105.

Figure 2:
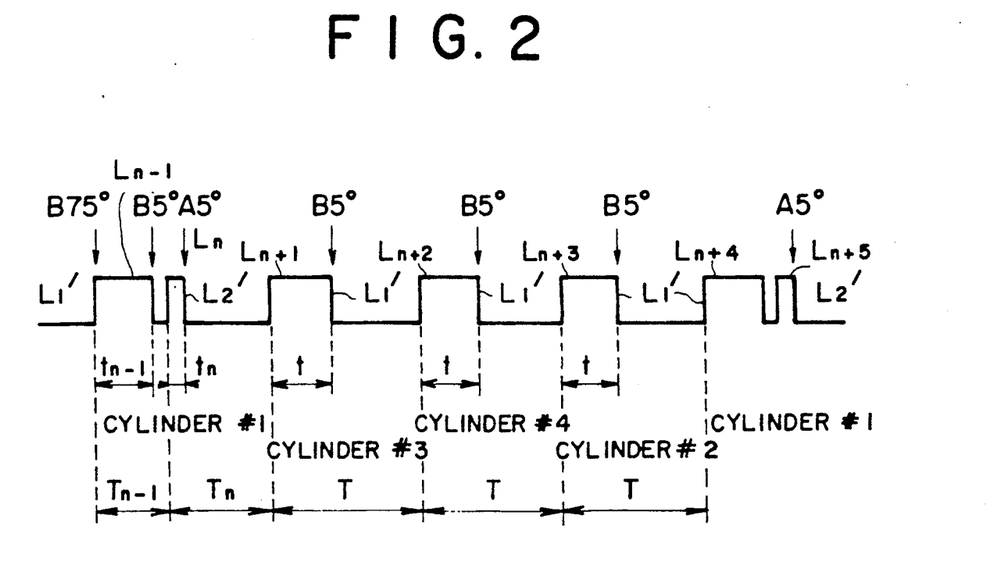
FIG. 2 is a waveform diagram of the output signal of the signal generator of FIG. 1.

Thus, as illustrated in FIG. 2, the output signal of the light sensor 105 includes a plurality of first or positional pulses $L'_1$ each in the form of a wide pulse relating to a corresponding first slit 103a and a second or cylinder recognition pulse $L'_2$ in the form of a narrow pulse corresponding to the second slit 103b. Each of the wide positional pulses $L'_1$ has a rising edge, which occurs at the leading edge of one of the first slits 103a (e.g., at the crank angle of 75 degrees before top dead center), and a falling edge, which occurs at the trailing edge thereof (e.g., at the crank angle of 5 degrees before top dead center). In the illustrated example, the narrow cylinder recognition pulse $L'_2$ follows a specific one of the wide positional pulses $L'_1$ corresponding to the specific reference cylinder, and has a rising edge, which occurs at the leading edge of the second slit 103b (e.g., slightly later than the falling edge of the specific one of the first wide pulses $L'_1$), and a falling edge, which occurs at the trailing edge of the second slit 103b (e.g., at the crank angle of 5 degrees after top dead center).

The output signal of the signal generator 108 is amplified by an unillustrated amplifier and then fed to the base of an unillustrated output transistor which has the collector coupled to an interface circuit of a cylinder recognition means in the form of a microcomputer and the emitter grounded, as in the conventional cylinder recognition apparatus illustrated in FIG. 7.

The construction and operation of this embodiment other than the above are substantially similar to those of the conventional cylinder recognition apparatus as illustrated in FIGS. 5 through 8.

Next, the operation of this embodiment will be described in detail with particular reference to the flow chart of FIG. 3.

When the engine is started to operate, the rotating plate 102 rotates in a direction indicated by arrow A in FIG. 1 in synchrony with the rotation of the engine, and the light sensor 105b of the signal generator 108 generates an output signal including first pulses $L'_1$ and second pulses $L'_2$, as shown in FIG. 2. The microcomputer (not shown) receives via the unillustrated interface circuit the output signal of the signal generator 108 as well as other engine operating parameters such as a switch-on signal which is generated upon turning on of a starter key, and processes them in the manner as shown in the flow chart of FIG. 3 in accordance with a control program stored therein.

Specifically, at first in Step S0, it is determined based on the engine operating parameters whether the engine is in an early stage of an engine starting operation. One example of the criteria for such determination is to determine whether a predetermined time has elapsed from the time of the turning on of the starter key. In this case, if the answer is "YES", then the engine is determined to be in an early stage of an engine starting operation, and if "NO", it is determined otherwise. There are also some other criteria. For example, the above determination can be made based on the number of firing, the number of revolutions per minute of the engine, a switch-off signal which is generated upon turning off of the starter key, etc., while providing substantially the same effects.

If the answer is "NO" in Step S0, then the program goes to Step S1 wherein the length or pulse width t of each pulse $L'_1$ or $L'_2$ of the signal generator output signal as well as the period or pulse interval T between the rising edges of successive pulses are calculated so as to determine whether it is a positional pulse $L'_1$ or a cylinder recognition pulse $L'_2$. In Step S2, the duty cycle t/T for each pulse is then calculated based on the pulse width t and the pulse interval T thus calculated. Subsequently, in Step S3, based on the duty cycle t/T thus calculated, the difference between the present or latest duty cycle data $(t/T)_n$ for the present or latest pulse $L_n$ and the preceding duty cycle data $(t/T)_{n-1}$ for the preceding pulse $L_{n-1}$ is calculated, and it is determined whether the absolute value of the difference $\{(t/T)_n - (t/T)_{n-1}\}$ is greater than a prescribed value $\alpha$. If $(t/T)_n - (t/T)_{n-1} > \alpha$ (i.e., the present or latest duty cycle $(t/T)_n$ for the present cylinder recognition pulse $L_2$ has greatly changed from the preceding duty cycle $(t/T)_{n-1}$ for the specific positional pulse $L_1$, e.g., the pulse width of a cylinder recognition pulse $L_2$ (i.e., the circumferential length of the second slit 103b) can be set to be much shorter than that of a positional pulse $L'_1$ (i.e., the circumferential length of the first slits 103a) ), then the program proceeds to Step S4 wherein the present pulse $L_n$ is determined to be a second pulse $L'_2$, and hence the specific reference cylinder #1 corresponding to the second pulse $L'_2$ is recognized or discriminated. Once the specific reference cylinder #1 is thus discriminated, it is automatically determined to which cylinders the succeeding pulses ($L_{n+1}$, $L_{n+2}$, . . . ) correspond since the operational order of the cylinders is predetermined. After the specific reference cylinder #1 has been recognized in this manner, a flag such as "1" representative of the specific cylinder #1 is set in a register in the microcomputer, and a return is performed.

On the other hand, if the answer is "YES" in Step S0, then the program skips Steps S1 through S4 and jumps to Step 5 without effecting cylinder recognition, and a return is performed. Thus, during the early stage of an engine starting operation in which the operation or rotation of the engine is not steady and hence there is a considerable possibility of incorrect or inaccurate cylinder recognition, cylinder recognition is ceased, preventing the result of the incorrect cylinder recognition from being used for engine control.

Further, if it is determined in Step S3 that $(t/T)_n - (t/T)_{n-1} \leq \alpha$, the program jumps to Step S5 while skipping Step S4, and a return is performed so that the Steps S0 through S3 are then repeated until the specific cylinder #1 is recognized.

In this connection, in Step S3, instead of determining whether or not $(t/T)_n - (t/T)_{n-1} > \alpha$, the duty cycle t/T for each pulse $L_1$, $L_2$ can be compared with a prescribed value $\beta$, and if $t/T > \beta$, the pulse is determined to be a specific positional pulse corresponding to the specific cylinder #1. This is because the duty cycle t/T for the specific positional pulse is generally much higher than that for the other positional pulses or that of the cylinder recognition pulse. On the other hand, in cases where the duty cycle t/T for a cylinder recognition pulse is set to be much lower than that for the positional pulses, it is possible to determine a pulse to be a cylinder recognition pulse if the duty cycle t/T for the pulse is less than a prescribed value.

After a cylinder recognition pulse $L'_2$ corresponding to the specific cylinder #1 has once been recognized in the above manner, it becomes possible to discriminate the respective remaining cylinders based on the subsequent positional pulses $L'_1$, so various engine operations such as ignition, fuel injection, etc., can be properly controlled based on the rising edge and/or falling edge of each positional pulse $L'_1$. For example, ignition can be controlled such that the current supply to the ignition coil of the engine is cut off at the falling edge of each positional pulse $L'_1$ so as to properly control the ignition timing of a corresponding cylinder. In this case, however, when a specific positional pulse $L'_1$ corresponding to the specific cylinder #1 has not yet been discriminated or recognized, ignition is controlled to take place at the falling edge of each pulse $L'_1$ or $L'_2$ of the signal generator output pulse. If a cylinder recognition signal $L'_2$ follows shortly after the falling edge of a specific positional pulse $L'_1$, as clearly shown in FIG. 2, a first ignition will take place in the specific cylinder #1 at the falling edge (e.g., at 5 degrees before TDC) of a specific positional pulse $L'_1$ corresponding to the specific cylinder #1, but a subsequent ignition will not take place at the falling edge (e.g., at 5 degrees after TDC) of a cylinder recognition pulse $L'_2$ following the specific positional pulse $L'_1$ since the first ignition already took place shortly before the falling edge of the cylinder recognition pulse $L'_2$ and there is no sufficient voltage built up on the ignition coil during a short time between the falling edges (e.g., between 5 degrees before TDC and 5 degrees after TDC) of the successive pulses $L'_1$, $L'_2$.

Figure 3:
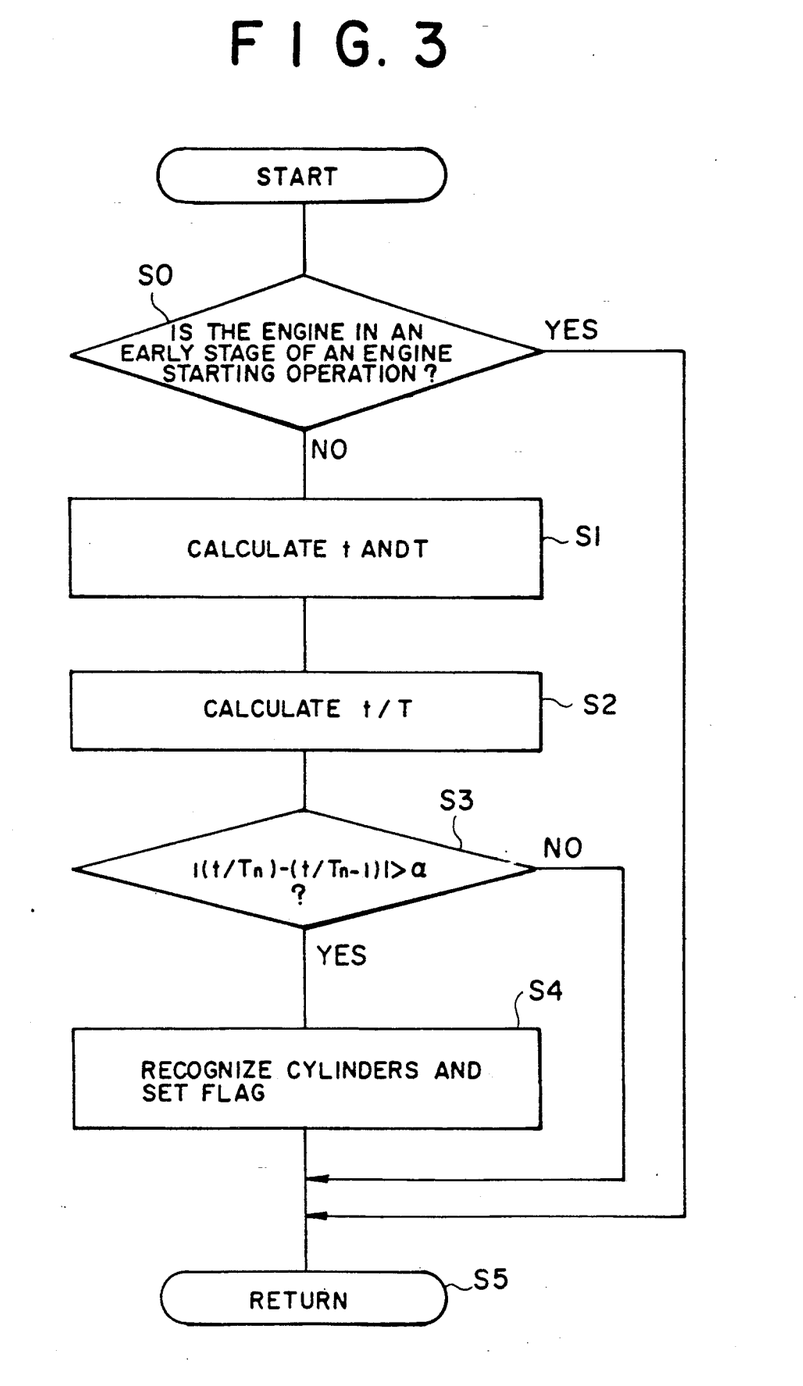
FIG. 3 is a flow chart illustrating the operation of a cylinder recognition apparatus for a multi-cylinder internal combustion engine equipped with the signal generator of FIG. 1 according to a first embodiment of the present invention.
Figure 4:
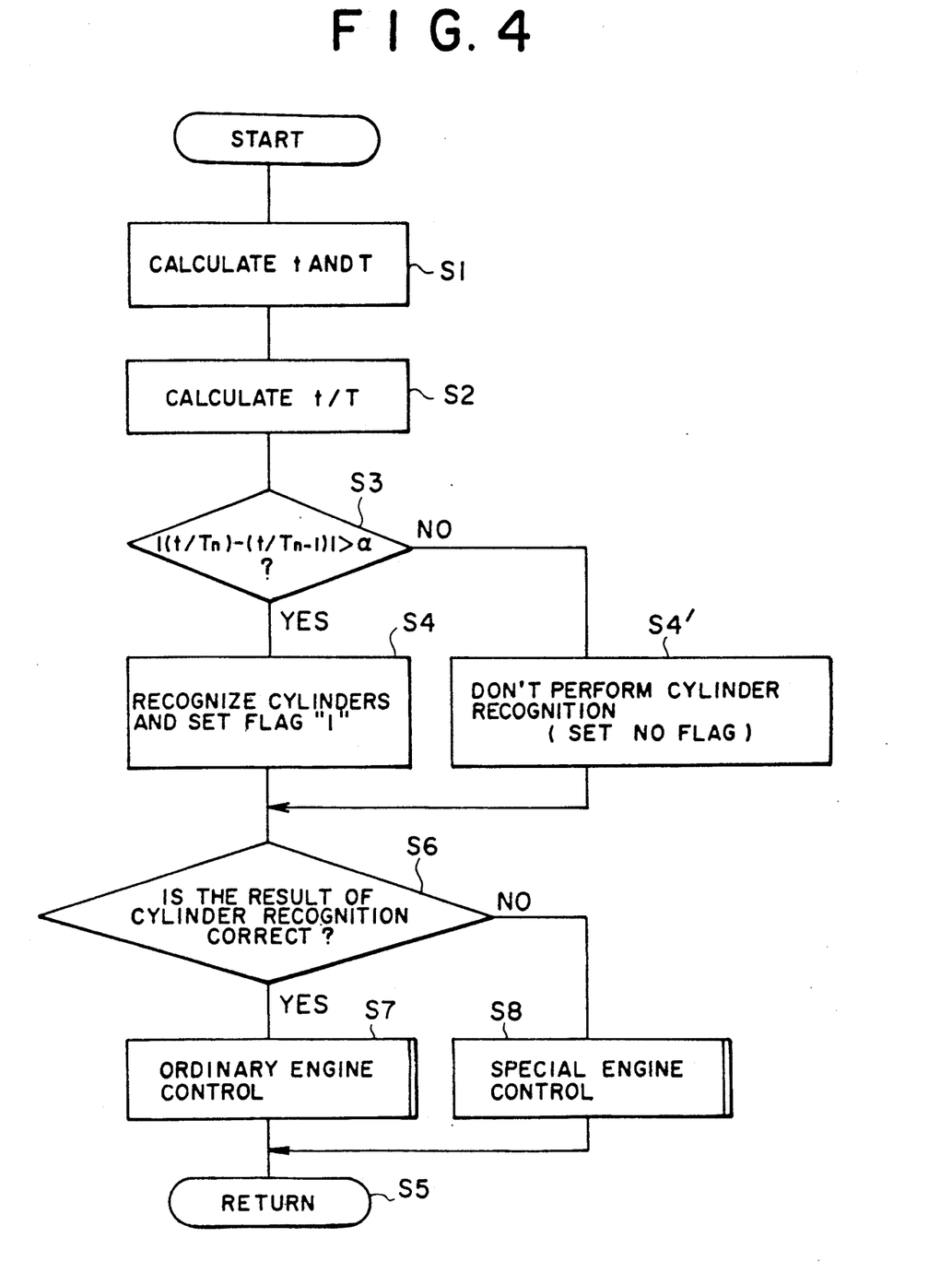
FIG. 4 is a view similar to FIG. 3, but illustrating the operation of a cylinder recognition apparatus according to another embodiment.

FIG. 4 illustrates another embodiment of the present invention. In this embodiment, Step S0 of FIG. 3 is omitted and new Step S4' and Step S6 through S8 are added to the embodiment of FIG. 3, and the other Steps S1 through S5 remain unchanged. In this embodiment, instead of determining whether the engine is in an early stage of an engine starting operation and stopping cylinder recognition if the answer is "YES" as in the embodiment of FIG. 3, the result of cylinder recognition is checked. Specifically, if it is determined in Step S3 that the answer is "NO", the program goes to Step S4' where cylinder recognition is not carried out and a flag is not set (i.e., set to be "0") in a register of the microcomputer (not shown). Then, in Step S6, it is determined whether the result of the cylinder recognition as performed in Step S4 is correct. This determination is carried out based, for example, on the contents of the resister as set therein. For example, a series of flags (corresponding to respective cylinders) set in the resister are checked or compared with a predetermined reference. For example, if the content of the resister corresponding to four cylinders (the order of successive cylinder recognitions) is 1000, the result of this cylinder recognition is determined to be correct, and if otherwise (e.g., 1010, 1100, 0101, 0011, etc.,), the cylinder recognition is determined to be incorrect. Thus, in the event that the intervals between successive pulses of a positional signal are varied as in an early stage of an engine starting operation, a flag is not set for the specific cylinder so the content of the register becomes abnormal. In this case, it is determined that the cylinder recognition is incorrect.

If it is determined in Step S6 that the answer is "YES", the program goes to Step S7 where the engine is controlled in an ordinary control mode based on the result of the cylinder recognition as was the case with the previous embodiment of FIG. 3 after the completion of cylinder recognition. On the other hand, if the answer is "NO" in Step S6, the program goes to Step S8 where the engine is controlled in a special control mode without regard to the cylinder recognition result. After Steps S7 and S8, a return is performed in Step S5.

For example, in Step S8, a special ignition control called "bypass ignition control" is performed based on the conventional mechanical distributor control in combination with the positional signal L. In other words, the current supply to the ignition coil of the engine is started at the rising edge (at 75 degrees before TDC) of each pulse of the positional signal $L_1$ and interrupted at the falling edge (at 5 degrees before TDC) of each pulse thereof, causing the spark plug to electrically spark. In this case, for the cylinder #1, the current supply is also controlled to be turned on and off by the cylinder recognition signal $L_2$., but there is no adverse effect on the engine operation because current interruption due to the cylinder recognition signal $L_2$. takes place after the spark plug has been caused to spark by the positional signal $L_1$. The determination Step S6 and the bypass ignition Step S8 are performed by the microcomputer so as to prevent the result of incorrect cylinder recognition due to improper or incorrect detection of signal pulses from being used for engine control such as ignition control, thus ensuring proper engine operation at all times particularly even in the early stage of an engine starting operation.

What is claimed is:

1. A cylinder recognition apparatus for a multi-cylinder internal combustion engine comprising:
   a signal generator for generating a single output signal in synchrony with the rotation of the engine, the output signal including a plurality of positional pulses each representative of prescribed rotational positions of a corresponding cylinder, and a cylinder recognition pulse at a location near a specific one of the positional pulses corresponding to a specific cylinder; and
   a controller for discriminating the cylinder recognition pulse from among the pulses contained in the output signal of the signal generator so as to recognize a specific positional pulse corresponding to a specific cylinder, the controller being operable to stop cylinder recognition in an early stage of an engine starting operation.

2. A cylinder recognition apparatus as claimed in claim 1, wherein the controller operates to stop cylinder recognition during a predetermined period of time from the beginning of the engine starting operation.

3. A cylinder recognition method for recognizing the operating states of cylinders of a multi-cylinder internal combustion engine, the method comprising the following steps:
   generating, in synchrony with the rotation of the engine, a single signal including a plurality of positional pulses each representative of prescribed rotational positions of a corresponding cylinder, and a cylinder recognition pulse at a location near a specific one of the positional pulses corresponding to a specific cylinder;
   determining whether the engine is in an early stage of an engine starting operation;
   discriminating the cylinder recognition pulse from among the pulses contained in the single signal so as to recognize a specific positional pulse corresponding to a specific cylinder if it is determined that the engine is not in an early stage of an engine starting operation; and
   stopping cylinder recognition if the engine is in an early stage of an engine starting operation.

4. A cylinder recognition method as claimed in claim 3, wherein in the above-mentioned last step, cylinder recognition is stopped during a predetermined period of time from the beginning of the engine starting operation.

5. A cylinder recognition apparatus for a multi-cylinder internal combustion engine comprising:
   a signal generator for generating a single output signal in synchrony with the rotation of the engine, the output signal including a plurality of positional pulses each representative of prescribed rotational positions of a corresponding cylinder, and a cylinder recognition pulse at a location near a specific one of the positional pulses corresponding to a specific cylinder; and
   a controller for discriminating the cylinder recognition pulse from among the pulses contained in the output signal of the signal generator so as to recognize a specific positional pulse corresponding to a specific cylinder, the controller being operable to determine whether the result of the cylinder recognition is correct or incorrect.

6. An engine control apparatus as claimed in claim 5, wherein the controller sets a flag when the specific cylinder is recognized, but does not set a flag when such cylinder recognition is not performed, the controller being operable to evaluate the result of the cylinder recognition based on a comparison of the order of a series of flags thus set with a predetermined flag order and determines that the result of the cylinder recognition is correct if the order of the set flags matches the predetermined flag order.

7. A cylinder recognition apparatus as claimed in claim 5, wherein the controller operates to control the engine based on the result of the cylinder recognition if the cylinder recognition is correct, but based on other engine operating parameters than the result of the cylinder recognition if the cylinder recognition is incorrect.

8. A cylinder recognition apparatus as claimed in claim 7, wherein the operation of the engine controlled by the controller is ignition timings of the respective cylinders.

9. A cylinder recognition method for a multi-cylinder internal combustion engine, the method comprising the following steps:
   generating, in synchrony with the rotation of the engine, a single signal including a plurality of positional pulses each representative of prescribed rotational positions of a corresponding cylinder, and a cylinder recognition pulse at a location near a specific one of the positional pulses corresponding to a specific cylinder;
   discriminating the cylinder recognition pulse from among the pulses contained in the single signal so as to recognize a specific positional pulse corresponding to a specific cylinder; and determining whether the result of the cylinder recognition is correct or incorrect.

10. A cylinder recognition method as claimed in claim 9, wherein the above-mentioned step of determining whether the result of the cylinder recognition is correct or incorrect comprises the steps of:

setting a flag when the specific cylinder is recognized, while setting no flag when such cylinder recognition is not performed; and evaluating the result of the cylinder recognition based on a comparison of the order of a series of flags thus set with a predetermined flag order and determining that the cylinder recognition is correct if the order of the series of set flags matches the predetermined flag order.

11. A cylinder recognition method as claimed in claim 9, further comprising the step of controlling the engine based on the result of the cylinder recognition if the cylinder recognition is correct, but based on other engine operating parameters than the result of the cylinder recognition if the cylinder recognition is incorrect.

12. A cylinder recognition method as claimed in claim 11, wherein the operation of the engine to be controlled is the ignition timings of the respective cylinders.

* * * * *